Nov. 5, 1940.  R. O. MOORE  2,220,773
METHOD OF WELDING OIL WELL CASINGS
Filed Nov. 14, 1938
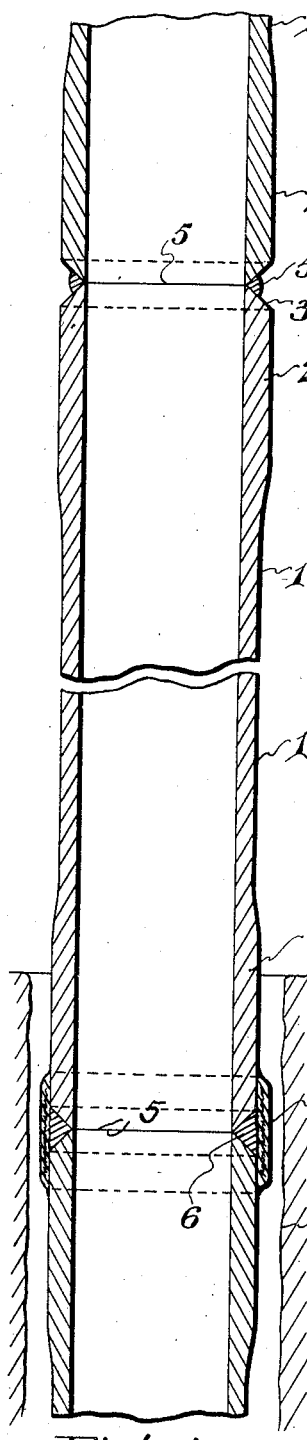
Fig. 1
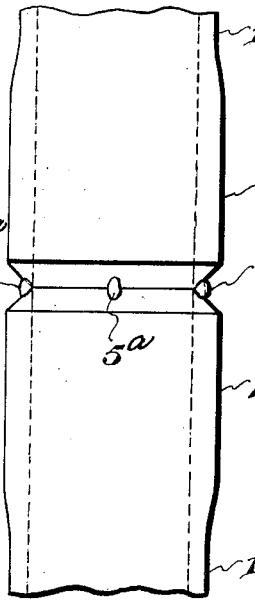
Fig. 2
Fig. 3
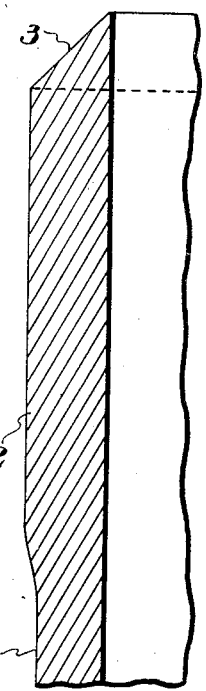
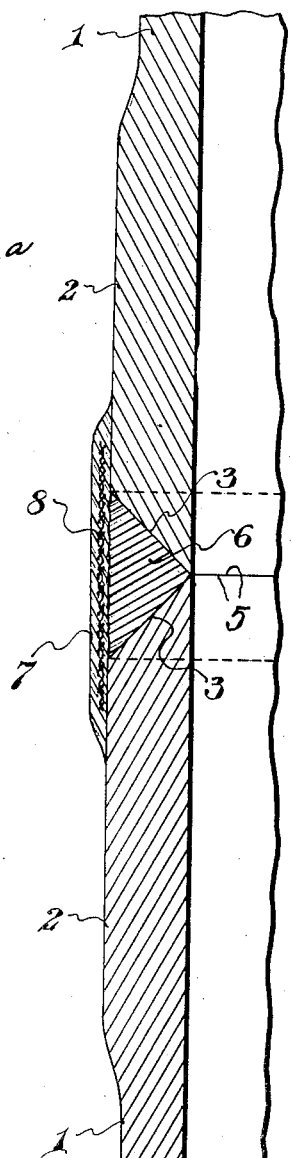
Fig. 4
Ralph O. Moore
INVENTOR
ATTORNEY Patented Nov. 5, 1940

2,220,773

UNITED STATES PATENT OFFICE 2,220,773

METHOD OF WELDING OIL WELL CASINGS

Ralph O. Moore, Tulsa, Okla.

Application November 14, 1938, Serial No. 240,375

2 Claims. (Cl. 166—21)

The invention relates to welded joints for oil well casing sections, and has for its object to provide the ends of the adjacent casing sections with welding surfaces having an area greater than the cross sectional area of the sections spaced from the enlarged ends thereof, whereby the welded surface efficiency will be raised to a strength equal to or greater than the strength of the section spaced from the welded joints. It has been found that weld connections are from about eighty to ninety-five per cent efficient, therefore it is an object to provide a weld connection wherein the weld area of the adjacent sections will compensate in strength for the deficiency of strength incident to welding.

A further object is to provide thickened walls at the ends of the casing for obtaining the additional welding surface without increasing the thickness of the main bodies of the sections, thereby maintaining the weight of a well casing string at a minimum, which is an important advantage in long strings, for instance from three thousand five hundred feet up.

A further object is to bevel the ends of the enlargements of the casing sections so that, when they are brought together for a welding operation, annular V-shaped welding grooves are formed.

A further object is to provide a method of running in a welded sectional well casing while the welds are still hot, said method comprising the placing of a pad around the welded joint so the joint will slowly cool and not be chilled, which sudden chilling decreases the efficiency of the welded joint.

A further object is to provide a well casing section having enlarged ends terminating in welding surfaces of greater area than the cross sectional area of the section between the enlarged ends.

With the above and other objects in view the invention resides in the combination and arrangement of parts as hereinafter set forth shown in the drawing, described and claimed, it being understood that changes in the precise embodiment of the invention may be made within the scope of what is claimed, without departing from the spirit of the invention.

In the drawing:

Figure 1 is a vertical transverse sectional view through a plurality of well casing sections showing the same being run into a well.

Figure 2 is a view in elevation of one of the joints showing the initial welding operation.

Figure 3 is a vertical transverse sectional view through one side of one of the enlarged section ends.

Figure 4 is a vertical transverse sectional view through one side of the joint, showing the protecting sleeve thereon.

Heretofore welded joints have failed in well casings because the weld joints have been the weakest points of the casing, hence welded casings are not favored for deep wells, for example three thousand five hundred feet and up, as a break entails a great deal of work and expense. The main difficulty in weld connections heretofore made was the fact that the weld surface was no greater than cross sectional area of the sections, and weld connections vary from eighty to ninety-five per cent in efficiency, hence it will be seen that the weak point of the casing is at the welds. Applicant has found that providing the casing sections 1 with enlarged ends 2 increasing the thickness of the walls of the ends, said ends can be bevelled as at 3 for increasing the welded surfaces and building up the efficiency of the weld to compensate for the well known deficiency in weld connections, and building up the weld efficiency of the joint, equal to or greater than the cross sectional breaking point of the main bodies of the sections. By test it has been found that under ideal conditions and with expert welders, only an average of ninety-five per cent quality welds are obtained. Some of the tests ran as low as eightly per cent. From this it will be seen that a weld joint must be provided which, when welded at the eighty per cent average, must be stronger than the casing itself to prevent breakage at the weld. This can only be accomplished by increasing the area of the weld surfaces at the joint. To provide a weld joint as strong as the body of the casing and keeping in mind that in some instances the welding efficiency is as low as eighty per cent the upset of the enlarged ends is increased twenty-five per cent more than the wall of the casing. This increases the metal area to one hunderd and twenty-five per cent as compared to the regular wall thickness which is the original one hundred per cent.

Under the above conditions if the welding efficiency of the joint is only eighty per cent it is clear that the weld will be as strong as the thinner portion of the casing sections. This additional area can not be obtained by increasing the thickness of the casing walls throughout its length, as such a procedure would increase the weight of the casing string to a prohibitive point, particularly in deep wells. On the other hand if the weld is built up along the periphery of the section ends to increase the weld surfaces the intense heat will weaken the section ends.

The casing sections are welded together as the casing is run into the well 4. First, the sections are placed in alinement with their sharp edges 5 in engagement with each other as clearly shown in Figure 1 and then the sections are connected together in the bottom of the V-shaped groove at spaced points as shown at 5ª, and then the welding operation continues until the welding channel is filled as shown at 6, Figure 1. It has been found that where the joints are run into the well hot that the sudden chilling of the weld joint may have a deteriorating effect on the joint, and to overcome this difficulty a protecting annular pad 7 is provided around the joint. This pad may be formed from asbestos or other material having a reinforcing member 8 therein, preferably formed from woven wire material. The pad allows the joint to slowly cool. The pads may be placed on the section ends before the welding operation and then moved to position over the completed joint. It will be noted that the enlargement on the outside of the casing sections allows a smooth inner bore to the casing.

From the above it will be seen that a welded casing is provided for oil wells wherein the welding efficiency of the joints is equal to or greater than the breaking point of the bodies of each section and that the weight of the casing string is not materially increased.

It will also be seen that the joint does not materially increase the weight of the string, and a welded casing is provided which may be safely used in deep wells, for instance from eight thousand to ten thousand feet. Heretofore it has not been safe to attempt deep well operations with welded casings having weld surfaces equal to or less than the cross sectional area of the casing sections. Such welds provide the weak points in the casing. Applicant's joint has been used in deep wells and under actual tests for strength the casing sections break at points spaced from the joints.

The invention having been set forth what is claimed as new and useful is:

1. The method of joining well casing sections by welding the sections together as the casing is lowered into a well, said method comprising welding the sections together above the well and finally placing an insulating material around the connections before they enter the well for preventing rapid chilling of the weld connections as they successively pass downwardly into the well.

2. A method of forming a well casing from casing sections as the casing is lowered into a well, said method comprising first lowering a casing section partially into a well, next welding a second casing section axially to the upper end of the first mentioned section, applying an insulation around the weld and adjacent pipe ends and finally lowering the sections into the well before the cooling of the weld.

RALPH O. MOORE.